Inventors:
William G. Rowell,
Edward B. Farmer,
by C. Yardley Chittick
Attorney

Inventors:
William G. Rowell,
Edward B. Farmer,
by Yardley Chittick
Attorney

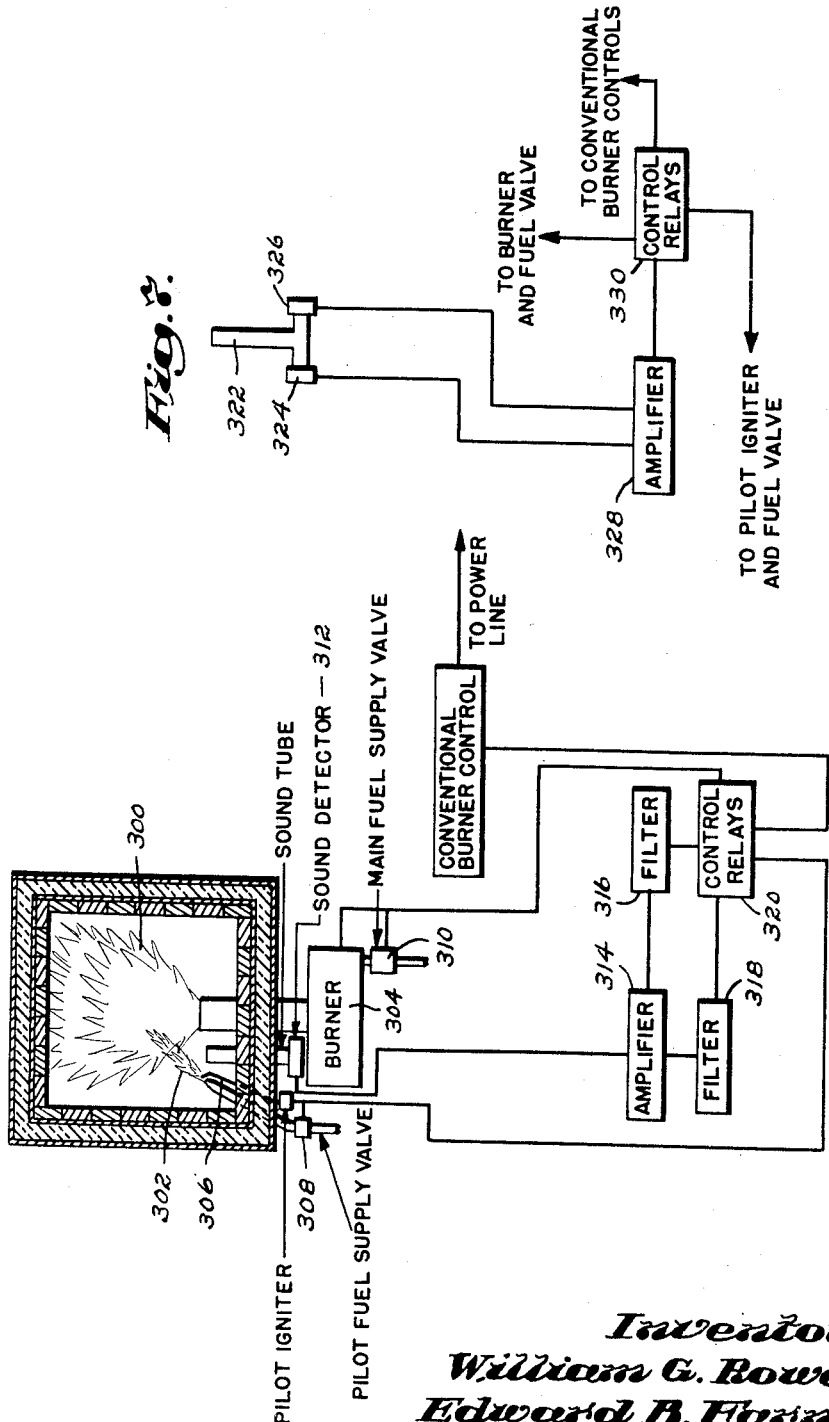

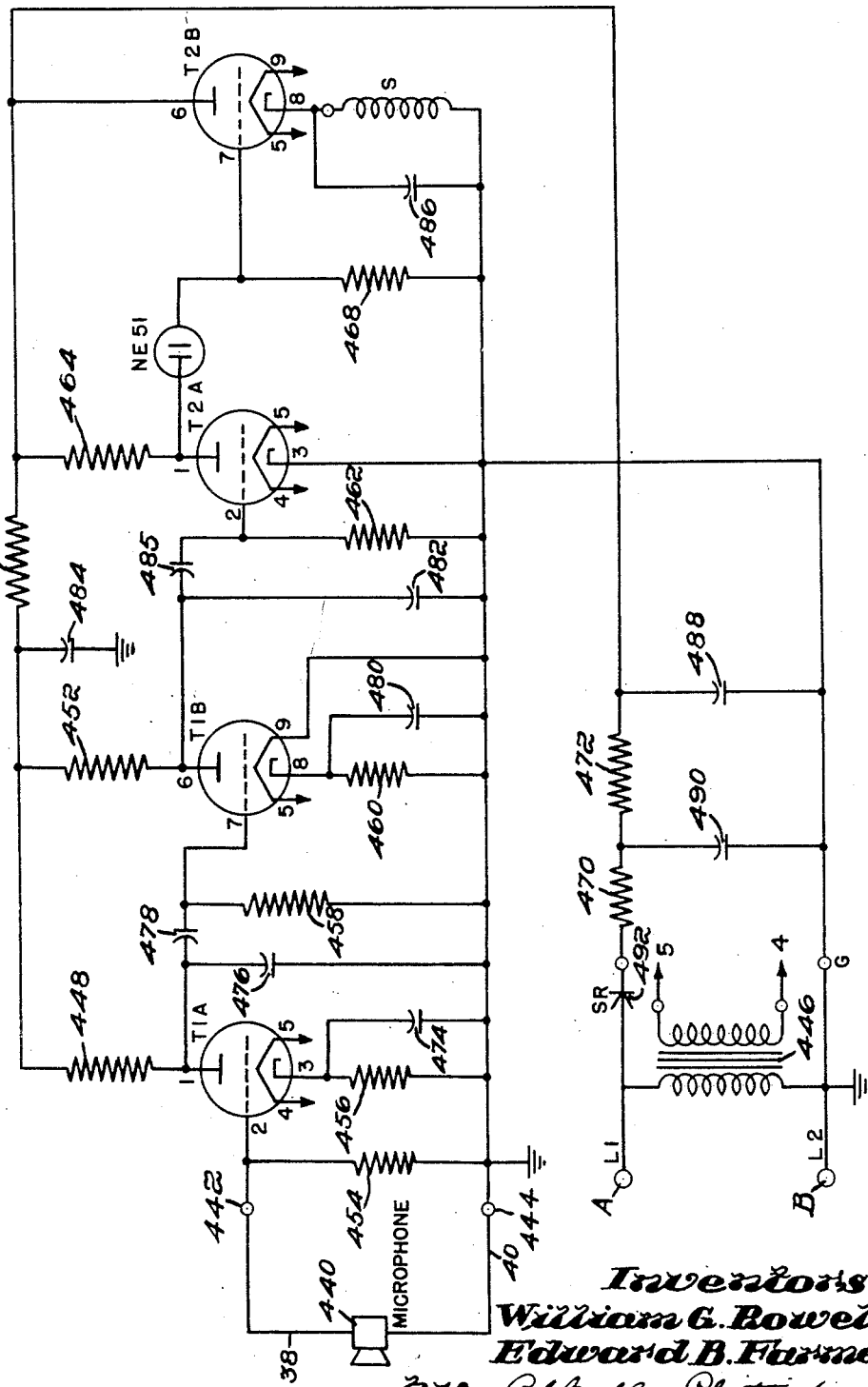

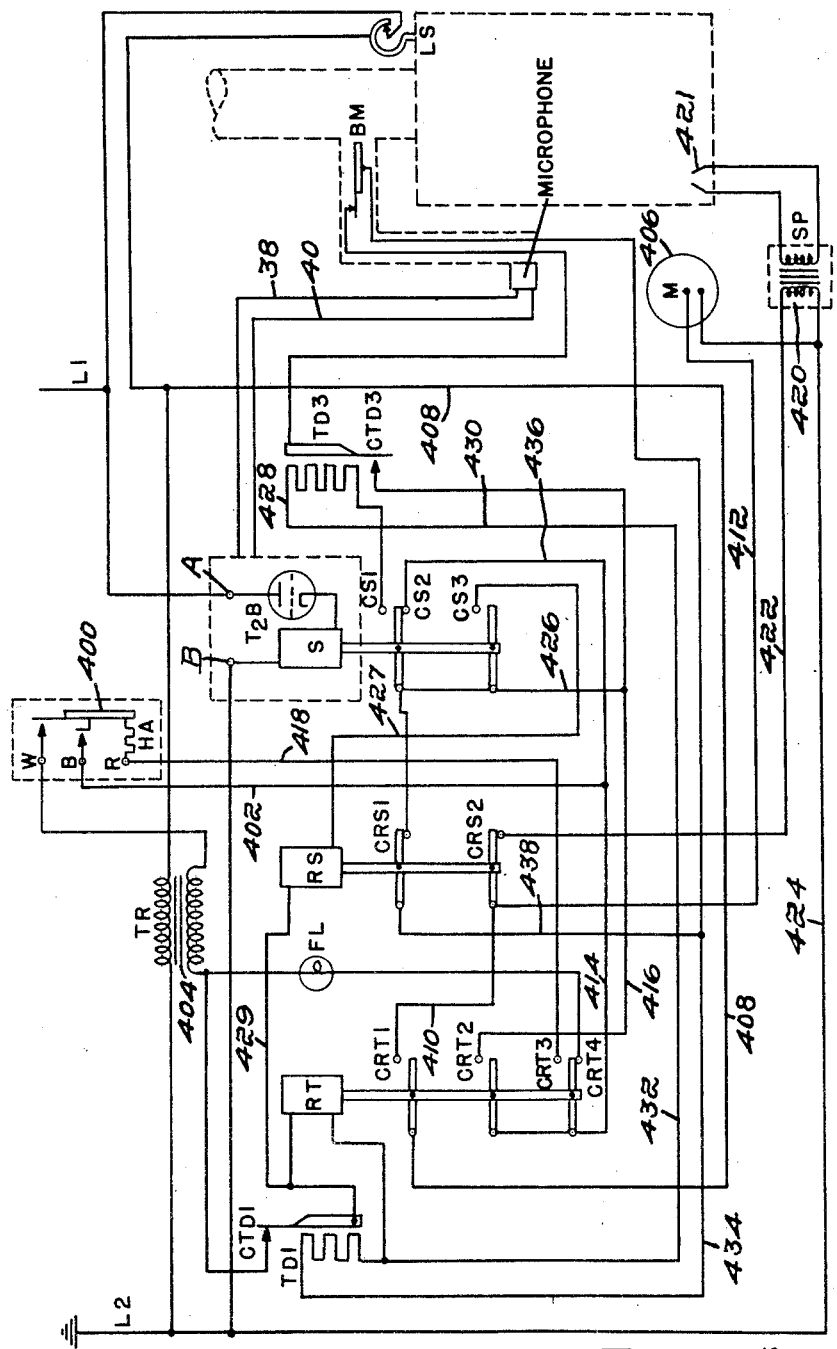

United States Patent Office 2,767,783
Patented Oct. 23, 1956

2,767,783

SONIC CONTROL FOR BURNERS

William G. Rowell, Quincy, and Edward B. Farmer, Waban, Mass., assignors to Scully Signal Company, Melrose, Mass., a corporation of Massachusetts Application September 9, 1952, Serial No. 308,661

14 Claims. (Cl. 158—28)

This invention relates to a new and novel method and means for controlling the operation of a flame producing burner. It is applicable to burners using liquid fuel, such as conventional domestic or commercial oil burners, and is also applicable to burners using gas.

This application is a continuation-in-part of the application of William G. Rowell and Edward B. Farmer filed September 27, 1951, Serial No. 248,476, now abandoned.

As is well understood in the heating industry using oil or gas burners, it is essential that means be provided for preventing accumulations of explosive mixtures in the firebox and other parts of the system which could be subject to unintentional ignition thereafter with disastrous results. This situation has been recognized by burner manufacturers in this field and controls of various types have been developed, designed to minimize the creation of unsafe conditions. The most common control now in use is actuated on thermal principles whereby the development or lack of development of suitable temperature in the firebox and stack causes certain thermostatic elements to function to shut off the oil burner motor or to close a gas valve, thereby to prevent entrance into the firebox of unburned fuel. The principal objection to the thermal control system is its slow response which under certain conditions permits the development of dangerous conditions even though the control is functioning in a normal manner.

Another control that has come into limited use is that type utilizing the photoelectric cell. In this arrangement a so-called "electric eye" is directed at the flame location and arranged so that failure of the flame to develop within a suitable period or the unintentional extinguishing of the flame after the burner is in operation will shut off the fuel supply. This system, however, is unreliable for a number of reasons. It will fail to function properly if there are accumulations of soot on the electric eye or if the firebox is unusually smoky to vary the light intensity to an appreciable degree. Premature burner cut-off may also occur due to a momentary smoky flame period. These and other sources of trouble are continuously present and, therefore, while the photoelectric cell system performs satisfactorily under ideal conditions, it cannot be considered reliable.

Other systems of control utilize radiant heat from the flame, actuating a thermo-mercury switch. This is also subject to many of the undesirable effects found with the photoelectric cell control.

Another method uses an electrode that is impinged by the flame. This requires frequent replacement of the electrode which deteriorates under the flame action with consequent erratic control.

Another system of control hinges on the electrical conductivity of the flame. The effectiveness of this method depends upon an unvarying relatively high resistance by the electrode that is positioned in the flame and the ground. However, due to reasons such as carbonization and dampness, a condition that simulates normal combustion may sometimes be presented causing improper operation.

Accordingly, it is an object of this invention to provide a new control system in which the controls are caused to function solely by the presence or absence of a normal flame. The invention contemplates generally means for picking up the sound that is present in the firebox when the burner is in operation. The pickup may also receive other extraneous sounds such as may be developed by the oil burner motor, vibrations caused by boiling water and sounds exterior of the building which may enter through the chimney. All sounds picked up are then utilized as a control for an electrical system so designed to close or open certain circuits only when a normal burner flame exists. Those sounds other than the burner sounds are filtered out sufficiently so that it may be said that the sound of the flame is the only sound that is present to cause any effect on the controls. That is to say, the total sound present with the burner in operation consists of the extraneous sounds plus the sound of the flame produced by the burner. The extraneous sounds, when the burner is not in operation, produce a maximum sound level that is incapable of causing actuation of the control circuit. The addition of the flame sound, however, to the extraneous sounds brings the total sound up to an amplitude that is beyond the sound threshold at which the control circuit becomes responsive. In other words, there is no circuit response until the flame sound is added to all other sounds that are present in the operation of the system or may be produced exteriorly and which reach the sound pickup unit.

As a further safeguard to insure that the flame sound only causes response in the control circuit, there always being the possibility that some sound from an unknown or unexpected source might temporarily or permanently raise the sound amplitude above the minimum threshold, the frequency of the flame sound is also utilized. This fortunately can be done because investigation of the frequencies of various sounds produced or present in a firebox discloses that flame sounds are of relatively low frequency, running from perhaps 20 to 150 cycles per second with the maximum sound occurring between 25 and 100 cycles per second. The electrical circuits, therefore, can be arranged to take advantage of the flame sounds only so that presence or absence of the flame will cause substantially instantaneous reaction to cut off the fuel supply when no flame is present.

If we consider the operation of a conventional thermostatically controlled oil burner, the applicability of the sonic control thereto will be readily appreciated. In the usual situation, the thermostat in one of the rooms of the building calls for heat by closing the circuit to the oil burner. The burner motor immediately starts and commences to pump a mixture of oil and air into the firebox and, at the same time, another electrical circuit produces a spark across a pair of electrodes in the presence of the mixture of oil and air. This spark should cause the fuel to ignite at once and the burner is then in normal operation. The heat produced by the flame heats the boiler or other heat transmitting element in the normal manner with some of the heat being lost up the stack.

Should ignition of the fuel supply fail to occur, then it is obvious that so long as the oil burner motor continues to run a mixture of unignited oil and air will be pumped into the firebox and within a matter of seconds a dangerous condition can develop. Should the failure of ignition initially have been caused by lack of a spark due, perhaps, to bits of carbon on the electrodes and should these carbon particles thereafter be dislodged by the air blast, then the resulting delayed development of the spark would cause the ignition of the large volume of combustible vapors in the firebox to produce an explosion of disastrous proportions. With this in mind, it is obvious that if ignition does not occur immediately upon the starting of the oil burner, then the oil supply should be shut down at once before any dangerous mixture collects in the firebox.

Another dangerous situation that can occur is this. With the flame in normal operation, there may develop a temporary blocking of the oil supply caused by dirt particles or otherwise. The lack of oil, of course, causes the flame to go out but the motor driven pump continues in operation as the thermostat continues to call for heat. If, thereafter, while the pump is still in operation, the oil supply is restored, then an unignited mixture will be pumped into the firebox, there being no ignition spark present at that time. If the firebox is still at or near maximum temperature when the oil resumes, there is considerable likelihood that there will be enough heat present in the fire bricks or other parts to cause subsequent ignition of the mixture and a resulting dangerous explosion. From the foregoing, it is apparent that immediately upon the failure of the flame due to lack of oil, the motor and the pump should be stopped. Then, upon resetting and restarting of the system after removal of the obstruction, the ignition spark will be present to provide normal ignition and recommencement of the flame.

All of the foregoing dangerous conditions outlined cannot be reliably met by any other type of control to our knowledge. The thermal controls react too slowly, the photoelectric cell systems are unreliable due to carbonization of the eye and the electrical conductivity of the flame can be simulated under certain circumstances.

Accordingly, the use of our sonic control obviates all of the disadvantages of the other systems and presents an arrangement in which the fuel supply will be shut down immediately if initial ignition does not occur and the fuel supply will likewise be immediately shut down if the flame for any reason goes out during a period of normal operation.

It is particularly pointed out that while the present controls now in general use may be falsely actuated by simulations of a normal fire and subject to failures as outlined, none of these conditions can cause faulty operation of the sonic control. The sonic control is responsive only to the composite audible frequencies that are characteristic of combustion and produced in the combustion chamber, and which, when superimposed on the extraneous sound level, bring the amplitude above the minimum sound required to actuate the control circuit. Tests have shown that external sounds of large magnitude and in the combustion frequency band have negligible effect on the sonic control because of the very thorough shielding of the pickup microphone from all sounds exterior of the firebox.

A further object of the invention is to provide means to indicate the cause of the fuel supply being shut off by the monitoring mechanisms. The means for giving this indication may be either audible or visual or a combination of both. The purpose of such signal is to give immediate information of the reason for the faulty operation. That is, the signal will indicate whether the flame failure was caused by initial failure of ignition or subsequent failure of combustion. The signal thus calls attention to a burner shut-down caused by faulty operation and it also expedites repairs by telling the repairman the nature of the trouble.

Another object of the invention includes the provision of lock-out means so that repetitive starting of the burner when in faulty operation will be prevented.

For the purposes of illustration and disclosure, a control system for liquid fuel burners is shown. We particularly point out, however, that the invention is not limited to this type of burner but is equally adapted for use with gas burners and other applications where a control responsive to a particular range of audible frequencies is desired.

It is well understood that the human ear can detect and differentiate a plurality of sounds occurring simultaneously. For example, any person familiar with an oil burner can hear the sound of combustion even though other sounds, such as ignition spark, blower or fan noises, pump, boiling water, etc., are occurring at the same time and may even be of greater magnitude. If the combustion is lost, the lack of flame may be immediately detected by the ear even though all the other sounds remain present. This is due to the fact that each sound has a characteristic band of frequencies but may be of varying magnitude. The fact that there are bands of frequencies existing has been recognized heretofore by others who have studied the sounds produced by burners and recognition of this fact is necessary to an understanding of the invention.

It is also a fact that regardless of the type of burner used, for example, rotary, low pressure gun type, high pressure gun type, industrial types, etc., the sound frequency characteristic of the flame produced is substantially identical although the sound magnitude may vary greatly.

Recognizing that various sound frequencies may be present, it is obvious that a sound pickup means of suitable character be provided. In the preferred form we use a sound pickup having a diaphragm that will produce maximum response when subjected to frequencies in the order of 40 to 50 cycles per second. Some mechanical filtering will take place at the pickup and this will then require less electronic filtering. The sounds picked up are transmitted as an electric current with a fluctuating voltage to an electronic amplifier and filter. At this point only the frequency components within the selected frequency range and of substantial amplitude are utilized to actuate the control. All other frequencies are filtered out. We are aware that for some applications considerably less filtering will be required than that illustrated. For example, where 60 cycles A. C. is the power source, more filtering and components are used than would be the case if the power source were direct current. It has been found that the fundamental frequency of the A. C. power source is so close to the combustion sound frequency that additional filtering is necessary. It has also been found that where boiling water sounds or the like are not present in the heating system the filtering system can be appreciably reduced.

Another important feature of the invention is that it readily lends itself to modifications and improvements. For instance, for special cases, the simple addition of a tuning means will permit sharp tuning to the combustion frequency band for maximum response where interference from other sources was found. Printed circuits, miniature tubes and similar electronic developments appearing from day to day may be readily incorporated in the invention.

Another feature of the invention is the provision of means for reduction of filament voltage on the tubes during standby periods. Tests have shown that a marked increase in the life of a tube results whenever it is operated below its rated filament voltage. Of course, it is understood that if desired full interruption of the filament voltage during standby periods may easily be resorted to.

These and other objects of the invention will become more apparent as the description proceeds with the aid of the accompanying drawings in which Fig. 1 is a schematic view showing the general arrangement of the boiler burner, electronic controls and thermostat.

Fig. 6 shows an arrangement of the sonic control in which it is used in connection with monitoring a pilot and main flame.

Fig. 7 is a schematic showing of dual sound detectors providing for mechanical filtering at the sound source.

Fig. 8 shows a simplified form of sonic amplifier.

Fig. 9 shows a modified form of wiring for a sonic control relay circuit.

Figure 1:
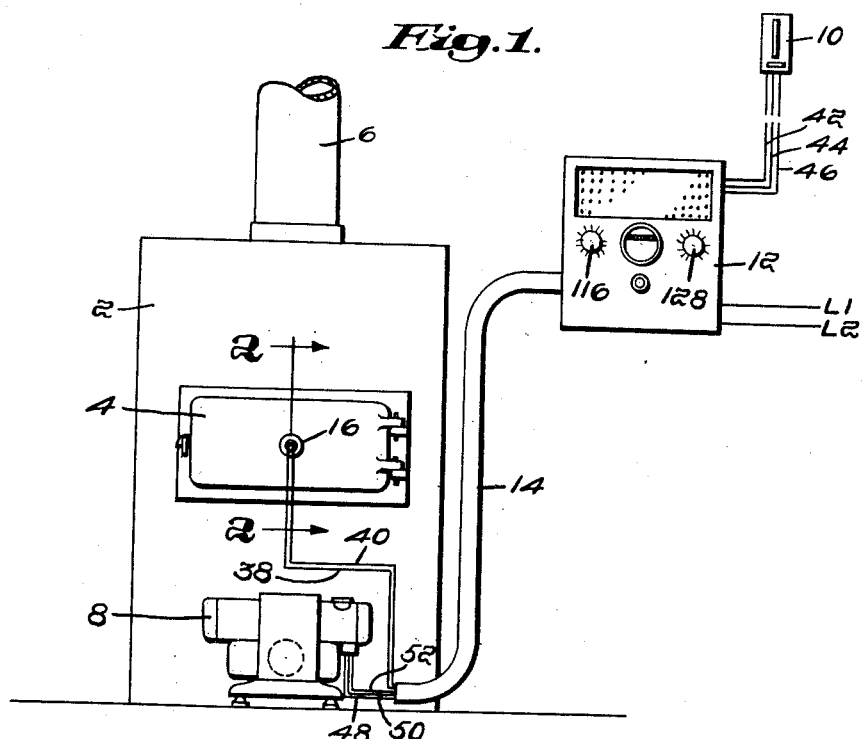

The general arrangement of the various elements used in carrying out the invention is shown in Fig. 1. This represents a typical gun type oil burner installation but, as pointed out heretofore, it may be considered equally illustrative of a rotary type burner, a larger commercial oil burner or a gas-fired burner.

A water boiler or heater is indicated at 2 having a firebox door 4 located in the usual position. A stack 6 leads to the chimney. A gun type oil burner 8 is located at the bottom of the firebox in the usual position. A thermostat 10 is located in one of the rooms to be heated where it will function in the customary manner. The unit 12 represents all of the control circuits which will be described hereinafter in connection with Figs. 3, 4 and 5. These control circuits in turn are connected by suitable wiring 14 with the oil burner 8 and the sonic pickup 16 that is preferably mounted in the firebox door 4.

Figure 2:
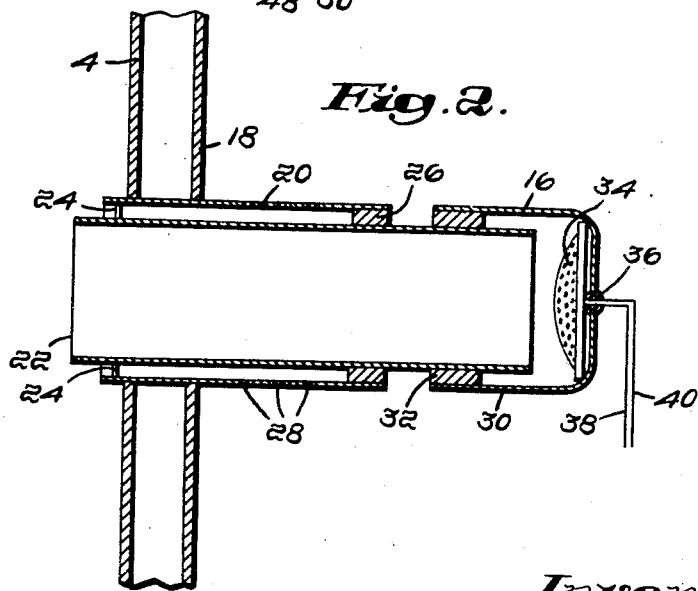
Fig. 2 is an enlarged vertical section on the line 2—2 of Fig. 1, showing one method of positioning the sonic pickup which has been found satisfactory.

The detailed construction of the sonic pickup 16 is shown in Fig. 2 where it will be seen that the firebox door 4 has a double wall 18 through which extends a tubular casing 20, which casing supports an interior concentric sound tube 22. This tube is spaced from casing 20 by radial supports 24 at the inner end and a ring 26 preferably of insulating material at the outer end of the casing. A plurality of air ports 28 permit outside air to flow into the space between the casing and sound tube to provide a cooling effect. When the burner is in operation there is always a slight negative pressure in the firebox so atmospheric air will automatically flow through the air ports and along sound tube 22 to provide a cooling effect. Casing 20 may be omitted if desired. The outer end of sound tube 22 is covered by a hood 30 which is maintained in slideable relation to the sound tube by a ring 32, also preferably of insulating material. At the end of hood 30 is a microphone 34 from which extends two wires 38 and 40 passing through a center opening 36. These wires lead to the input sockets 38' and 40' of the sonic amplifier circuit shown in Fig. 3 and Fig. 8.

A microphone which has been found suitable for use in this connection is a crystal or dynamic phone having a response as low as 30 cycles and insulated against high temperature. In a preferred form, the wires 38 and 40 will not be as two separate parallel wires but rather as one wire surrounded by a tube of copper braid much in the nature of a coaxial cable. The wire and braid are insulated from each other and in addition completely surrounded by exterior insulation. This form of two-wire cable is available in the market.

The thermostat 10 has three wires 42, 44 and 46 leading therefrom which feed into the unit 12 wherein the sonic control relay may function in response to the demands of the thermostat to control the oil burner 8. Wires 48, 50 and 52 lead from unit 12 to burner 8.

Figure 3:
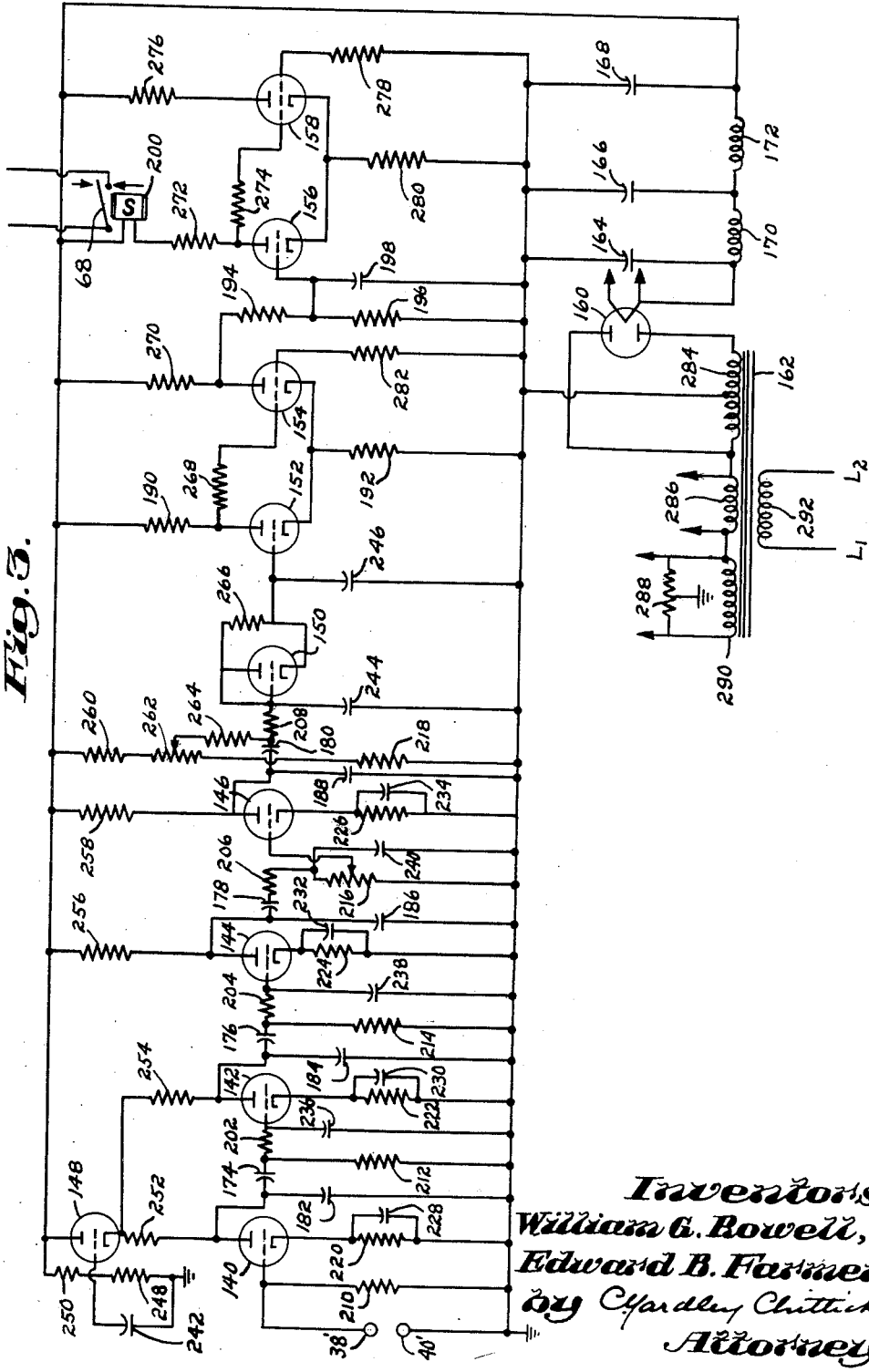
Fig. 3 shows the details of the wiring of one form of our sonic amplifier.
Figure 4:
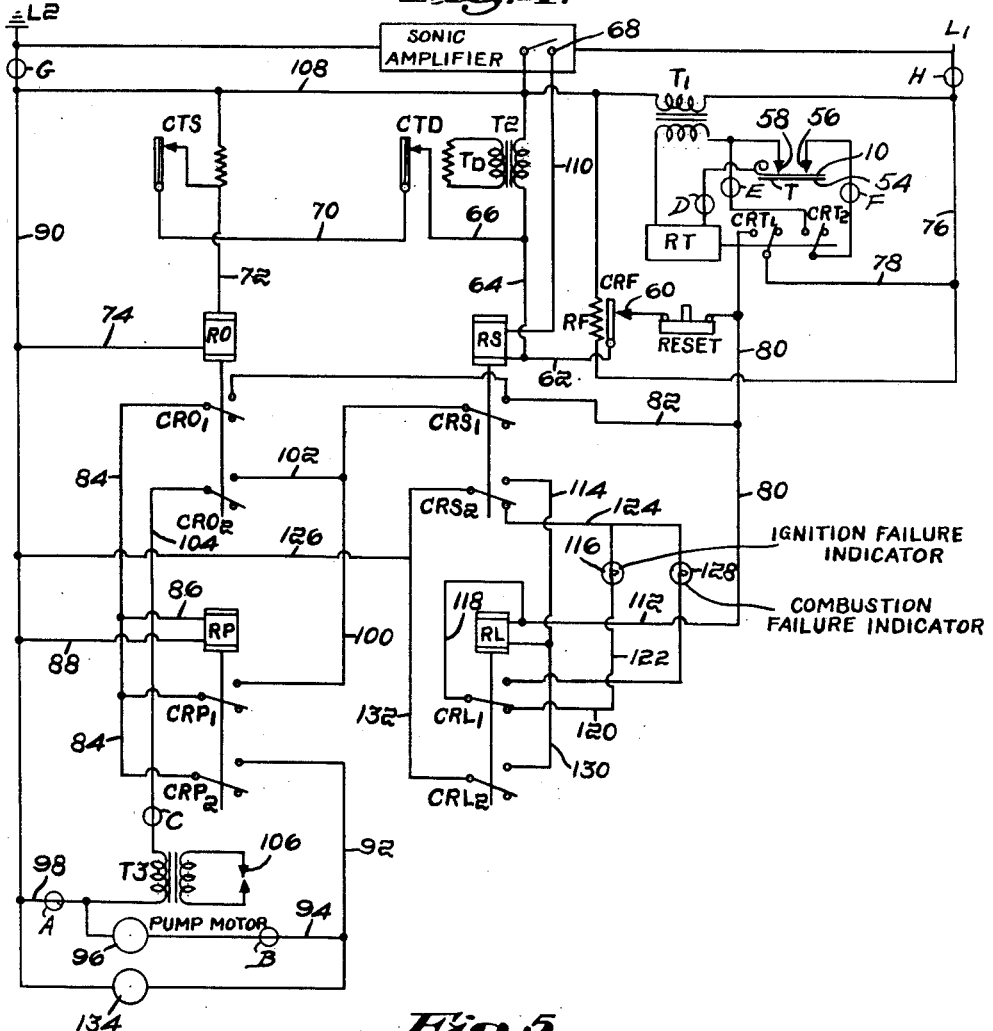
Fig. 4 shows the wiring diagram of one form of our sonic control relay wiring.
Figure 5:
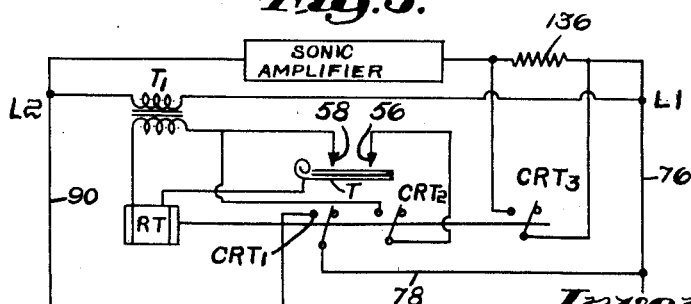
Fig. 5 shows a circuit for reducing the voltage on the sonic amplifier during standby periods.

The operation of the sonic controls shown herein in circuits disclosed in Figs. 3, 4 and 5 is as follows: Let us assume that prior to the commencement of the cycle, the burner is off and the thermostat 10 is not calling for heat. The operation of the sonic control relay circuit shown in Fig. 4 will now be specifically described.

This circuit comes into operation when the room thermostat T, and which has been numbered 10, is closed. With thermostat T open, the motor circuit cannot be closed and the flame, of course, will be out.

On reference to Fig. 4, there is shown the thermostat T in closed position. This is brought about by actuation of a thermal element 54 which on bending first makes contact at 56 and shortly thereafter makes contact at 58. When the thermostat opens the contacts open in the reverse order, 58 opening first and 56 last. Current is flowing continuously through the primary of transformer $T_1$. Closing of contact 58, which occurs after the closing of contact 56, energizes relay coil RT which closes contact $CRT_2$ and $CRT_1$. The circuits thus established through $CRT_2$ shunts the circuit through contact 58 and prevents chatter for the reason that the contact 56, having closed first, is now firmly in engagement with the bimetallic element. On opening, contact 58 opens first and then, when contact 56 opens thereafter, the relay coil RT is deenergized to open $CRT_2$, thus breaking the circuit completely and without chatter.

The closing of contact $CRT_1$ sets up a circuit from line $L_1$ through $CRT_1$, the reset switch which is normally closed and through contact CRF. CRF is normally closed so long as the thermal time delay RF is receiving line current maintaining it hot and causing the bimetallic element CRF to be in engagement with contact 60. When the power is off, CRF will be open, but closes in about 20 seconds after power is applied to time delay RF. The purpose of this time delay is to insure that the tubes of the sonic amplifier have had time to warm up and be in full operating condition by the time the sonic control relay circuit comes into operation. The circuit then follows the path through wires 62, 64 and 66, through contact CTD (which is normally closed for a period of 6 to 12 seconds after contact $CRT_1$ closes), through wire 70 through contact CTS to relay RO and thence through wire 74 to the line $L_2$.

Actuation of relay RO closes switches $CRO_1$ and $CRO_2$. The closing of contact $CRO_1$ energizes the protective relay RP, the current flowing through wires 76, 78, contact $CRT_1$, wires 80, 82, contact $CRO_1$, wires 84, 86, through relay RP and thence through wire 88 to the line 90. The energizing of relay RP closes contacts $CRP_1$ and $CRP_2$. The circuit through $CRP_2$ then closes the pump motor circuit of the oil burner through wires 92, 94 to the motor 96 and thence by wire 98 back to the line.

The closing of contact $CRO_2$ that occurs simultaneously with the closing of $CRO_1$ places the ignition spark in operation so that the oil now being pumped by the motor 96 will be ignited by the spark. The circuit to the spark transformer through $CRO_2$ is as follows: through wires 100, 102, contact $CRO_2$, wire 104 to the primary of the transformer $T_3$ and thence by wire 98 to the line. With current flowing in the transformer $T_3$, an induced current is set up in the secondary to complete a spark at the spark gap 106.

Under normal conditions the fuel will be ignited within a second or two and as soon as the flame develops it will produce its characteristic sound which will be picked up by the microphone 34 to induce a voltage in wires 38 and 40, which voltage is then amplified by the sonic amplifier circuit shown in Fig. 3 and which causes instantly the closing of switch 68. It will be understood, of course, that all of the tubes in the sonic amplifier circuit have been warmed up and are ready to function instantly when the microphone picks up the flame sound. Detailed explanation of the amplifier circuit will appear hereinafter.

As soon as switch 68 is closed a circuit will be established through relay RS from line $L_2$ by wire 108, switch 68, wire 110, coil RS thence to line $L_1$ via wire 62, contact 60, the reset switch, contact $CRT_1$ and wire 78. This causes the closing of contacts $CRS_1$ and $CRS_2$ which it should now be remembered close as soon as combustion commences. Closing of contact CRS₁ shunts contact CRO₁ and establishes a holding circuit for relay RP, being through CRS₁, wire 100, contact CRP₁, wire 84, wire 86, relay RP and wire 88 to the line. Thus as soon as the flame commences, a holding circuit is established which will maintain contacts CRP₁ and CRP₂ closed while, at the same time, permitting contact CTD to open in a period of about 6 to 12 seconds after combustion begins and after switch 68 has closed. The opening of CTD breaks the circuit through relay RO and when this occurs contacts CRO₁ and CRO₂ open. However, since the motor circuit is now through wire 92, contact CRP₂, wire 84, contact CRP₁, wire 100 and contact CRS₁, the pump motor continues in operation but the spark goes out because the contact CRO₂ has been opened by the deenergizing of relay RO. At this stage, normal combustion is underway. This situation will continue so long as the microphone 34 picks up the flame sound so that the sonic amplifier circuit of Fig. 3 will cause switch 68 to remain closed or until the thermostat T opens upon the satisfying of the required room temperature.

The opening of contacts 56 and 58 by virtue of the movement of the bimetallic element 54 will result in deenergizing relay RT to open switches CRT₁ and CRT₂. The opening of CRT₁ breaks the previously established circuit through CRS₁ and which is the circuit to the pump motor. Thus, satisfying of the room temperature will cause the pump to stop and the flame to go out and switch 68, controlled by the microphone, will then also open.

If, on the other hand, the room temperature has not been satisfied, so that the thermostat T is still closed, but combustion failure occurs in the firebox so that there is no longer present therein the flame, then the microphone 34, not hearing the flame sound, will cause the sonic amplifier circuit to function to open switch 68. This at once deenergizes relay RS causing contacts CRS₁ and CRS₂ to stop the motor.

From the foregoing, therefore, it can be seen that the oil burner pump motor 96 is shut off at once either when the room temperature is satisfied or the flame through lack of oil or some other cause has gone out while the thermostat T is still closed.

Flame failure causes relay RS to be deenergized to open CRS₁. This in turn deenergizes protective relay RP to open CRP₁ and CRP₂. Under such circumstance, the circuits are arranged so that the motor cannot be started again unless the spark 106 is provided at the same time. With CRS₁ open, the only circuit to the motor must be through CRO₁ and CRP₂, both of which are now open. This circuit cannot be established until relay RO is energized but RO cannot be energized until the open contact CTD is closed. CTD up to this time has been open because of the heat produced in the time delay transformer circuit TD which is created by the circuit formed by wire 78, contact CRT₁ (thermostat T is still closed), the reset button, contact 60, wires 62 and 64 through primary coil T₂ and thence to the line through wire 108. Thus, to close contact CTD it will be necessary to break the circuit just described and this is accomplished by pressing the reset button which breaks the circuit at that point. By holding the button open for 10 to 15 seconds, TD cools down enough to allow CTD to close. Then, on releasing the reset button a circuit is reestablished through CTD and CTS to energize relay RO. This, then, in turn causes contact CRO₁ to close and energizes relay RP to set up a circuit through CRP₁ to start the motor, and a circuit through CRP, wires 100 and 102 and CRO₂ to produce the necessary spark at 106 to cause combustion.

If there is combustion failure as just described so that no sound is heard by the microphone 34, the switch 68 will open in about two seconds thereafter to cause the deenergizing of relay RS. This slight delay in opening contact CRS₁ to stop the motor is of no consequence from a safety standpoint. If a delay relay with instantaneous reset is used instead of the time delay construction of TD in which a few seconds are required after the breaking of the circuit by the reset button to cause CTD to close, then it will only be necessary to open the reset button momentarily.

Attention is now called to two signal lights which have been incorporated so as to advise the user or the serviceman who might be called upon failure of the burner where the source of trouble lies. That is, the trouble can be due either to failure of the oil to ignite at the start of the cycle or to the flame going out while the burner is in operation. The first case is known as ignition failure and the second case is known as combustion failure.

In Fig. 4 it will be seen that the relay RL remains deenergized so long as relay RS is deenergized. If the thermostat T is closed and initial combustion occurs so that the sonic amplifier circuit causes switch 68 to close, then the relay RS will close contact CRS₂. This will establish a circuit through CRT₁, wires 80 and 112, relay RL, wire 114, contact CRS₂ and thence to wires 126 and 90 to line L₂. Actuation of relay RL closes contacts CRL₁ and CRL₂. Thus, since combustion has occurred no circuit will be established to cause the light 116 to glow. If, on the other hand, the flame had not ignited, then switch 68 would not close and contact CRS₂ would remain open (that is, in the position shown) to establish a circuit through wires 80, 112, 118, contact CRL₁ in open position as shown, wires 120, 122 through the light 116 to wire 124, contact CRS₂ and wire 126 to the line L₂. The thermostat T during this period would be closed as the room temperature would have been unsatisfied so that contact CRT₁ would be in closed position. It would thus be apparent from the fact that the bulb 116 was lighted that no flame had ever been generated. That is, at the start of the cycle the flame had not come on which might be due either to lack of oil or lack of spark or failure of the spark to ignite the oil. The serviceman could then take appropriate steps to remedy the trouble.

On the other hand, if combustion has occurred and is then interrupted for some reason such as failure of the oil supply, then the light 128 will come on to indicate that the difficulty was combustion failure. If the flame is in operation, switch 68 will be closed, relay RS energized and contact CRS₂ will be in up or closed position so that there can be no current flowing through wire 124. However, under operating conditions relay RL will be energized by current reaching it through wires 80 and 112 from line L₁ and through wire 126, contact CRS₂ and wire 114 from line L₂. With relay RL energized, contact CRL₁ will be in up or closed position and CRL₂ will likewise be in up or closed position to establish a holding circuit through wires 112, relay RL, wire 130, contact CRL₂, wire 132 and wire 126. Thus, failure of the flame and consequent opening of switch 68 and contact CRS₂ does not deenergize relay RL but when contact CRS₂ moves to down or open position then a circuit is established through wire 124, lamp 128, contact CRL₁ and wires 118, 112 and 80. The lighting of lamp 128 under these circumstances tells the serviceman that the failure has been caused by the flame going out after it has been in normal operation.

An additional feature is shown in Fig. 4 which has nothing to do with the control of the flame but which is helpful in securing information about the time of operation of the oil burner. This is a running time meter 134 shown at the bottom of Fig. 4 arranged in parallel with the pump motor circuit. Whenever the motor runs the time meter also runs so that the number of hours of operation of the motor may be known at all times. This helps in determining the rate of fuel consumption.

A modification is shown in Fig. 5. Here the relay RT operates three instead of two switches. The third switch contact CRT₃ throws a shunt around resistance 136 whenever the thermostat calls for heat. The purpose of the resistance 136, which will be in the sonic simplifier power circuit whenever the thermostat T and contact CRT3 are open and the amplifier is in standby operation, is to reduce the voltage on the amplifier tubes about ten percent. A ten percent voltage reduction on the tubes greatly increases their life but, at the same time, they will be maintained near substantially full temperature so that when the shunt through contact CRT3 is established upon the closing of thermostat T, the sonic amplifier circuit will be ready for instantaneous operation at full voltage.

The small circles in Fig. 4, lettered A, B, C, D, E, F, G and H, represent terminals, at which points the external connections from the pump motor, spark coil, thermostat and lines are made.

A description will now be given of the sonic amplifier circuit which receives the microphone input at 38' and 40' to cause switch 68 to be closed by actuation of relay S if a flame is present in the firebox.

The sonic amplifier illustrated in Fig. 3 is made up of the following sections: (1) Four stages of resistance coupled amplification including tubes 140, 142, 144, 146, which are in reality two tubes of the dual-triode type (type 6SN7); (2) A degenerative stabilizer represented by tube 148 and associated components; (3) A signal rectifier represented by tube 150 and associated components. Tubes 148 and 150 are halves of a dual-triode type 6SL7; (4) A snap action circuit known as a Schmidt circuit represented by tubes 152, 154 and associated components. These tubes are also halves of a dual-triode 6SN7; (5) A time delay circuit represented by tubes 156, 158 and associated components. These tubes are again halves of a dual-triode 6SN7; (6) Power supply and filter circuit represented by tube 160, transformer 162, condensers 164, 166, 168 and chokes 170 and 172.

The design and operation of the four stage amplifier is in accordance with standard practice. Since the combustion sounds, which are the basis of our control, are strongest (that is, have sufficient amplitude to raise the total sound well above the minimum sound threshold required to produce sufficient microphone voltage to actuate the control circuit) in the region 20–200 cycles, the amplifier was designed to have a minimum response at 20 cycles and very little above 200 cycles. This is accomplished, generally speaking, by using large coupling condensers for 174, 176, 178, 180 and large by-pass condensers for 182, 184, 186 and 188.

Since maximum amplification occurs near the power line frequency, disturbances have a tendency to cause spurious signals. The degenerative stabilizer, which is common in electronic practice, tends to maintain a constant plate voltage on tubes 140 and 142 when disturbances in line voltage occurs and thus prevent their amplification by subsequent stages to cause unwanted output signals.

Tube 150 acts as a diode rectifier of the A. C. signal received from tube 146. This rectified signal is applied to grid of tube 152 which, in the no-signal state, is non-conducting. The other half of the Schmidt circuit, tube 154, is conducting in the no-signal state. As signal is applied to grid of tube 152 plate current is drawn through resistor 190 which makes the grid of the tube 154 more negative. This reduces current through tube 154 which in turn cuts down bias voltage across resistor 192 which tends to further increase current through tube 152. Due to this regenerative action the application of a signal to the grid of tube 152 causes it to conduct fully while tube 154 is extinguished at once. Thus the Schmidt circuit causes snap action on a varying signal which is highly desirable for control purposes.

When tube 154 ceases to conduct the voltage across resistors 194 and 196 rises immediately. However, the charging of condenser 198 holds down the voltage applied to the grid of tube 156 for a time determined by the values of resistor 196 and condenser 198. When the voltage on grid of tube 156 rises a similar action to that described above for the Schmidt circuit takes place. The result is that tube 156 conducts at once while tube 158 ceases to conduct. Relay 200 is therefore actuated without pulsation even though a pulsating signal may cause it to operate. The purpose of the time delay is to prevent sudden sounds of a spurious nature from operating the control circuits. However, we have found that when properly installed a microphone mounted as shown in Fig. 2 is practically unaffected by sounds originating outside of the firebox.

*Amplifier component specifications*

| Part No. | Item |
| --- | --- |
| 140 | ½ of 6SN7 tube. |
| 142 | Do. |
| 144 | Do. |
| 146 | Do. |
| 148 | ½ of 6SL7 tube. |
| 150 | Do. |
| 152 | ½ of 6SN7 tube. |
| 154 | Do. |
| 156 | Do. |
| 158 | Do. |
| 160 | 5Y3 rectifier tube. |
| 162 | Power transformer. |
| 164 | 8 mfd. 450 volt electrolytic condenser. |
| 166 | Do. |
| 168 | 20 mfd. 450 volt electrolytic condenser. |
| 170 | 15 Henry choke. |
| 172 | Do. |
| 174 | .25 mfd. 400 volt paper condenser. |
| 176 | Do. |
| 178 | .1 mfd. 400 volt paper condenser. |
| 180 | Do. |
| 182 | .15 mfd. 400 volt paper condenser. |
| 184 | Do. |
| 186 | Do. |
| 188 | Do. |
| 190 | 18,000 ohm 1 watt resistor. |
| 192 | 10,000 ohm 1 watt resistor. |
| 194 | 4.7 megohm resistor. |
| 196 | 1.5 megohm resistor. |
| 198 | 1.5 mfd. 200 volt paper condenser. |
| 200 | 10,000 ohm sensitive relay. |
| 202 | 100,000 ohm resistor. |
| 204 | Do. |
| 206 | Do. |
| 208 | Do. |
| 210 | 1 megohm resistor. |
| 212 | Do. |
| 214 | Do. |
| 216 | 1 megohm potentiometer. |
| 218 | 47,000 ohm resistor. |
| 220 | 1,000 ohm resistor. |
| 222 | Do. |
| 224 | Do. |
| 226 | 1,500 ohm resistor. |
| 228 | 25 mfd. 25 volt electrolytic condenser. |
| 230 | Do. |
| 232 | Do. |
| 234 | Do. |
| 236 | .01 mfd. 100 volt paper condenser. |
| 238 | Do. |
| 240 | Do. |
| 242 | 16 mfd. 450 volt electrolytic condenser. |
| 244 | .01 mfd. 400 volt paper condenser. |
| 246 | .5 mfd. 400 volt paper condenser. |
| 248 | 1 megohm resistor. |
| 250 | 3.3 megohm resistor. |
| 252 | 27,000 ohm resistor—1 watt. |
| 254 | 27,000 ohm 1 watt resistor. |
| 256 | Do. |
| 258 | Do. |
| 260 | .22 megohm resistor. |
| 262 | 50,000 ohm potentiometer. |
| 264 | 1 megohm resistor. |
| 266 | 1.8 megohm resistor. |
| 268 | .22 megohm resistor. |
| 270 | 27,000 ohm 1 watt resistor. |
| 272 | 22,000 ohm 1 watt resistor. |
| 274 | .22 megohm resistor. |
| 276 | 27,000 ohm 1 watt resistor. |
| 278 | 68,000 ohm resistor. |
| 280 | 10,000 ohm 1 watt resistor. |
| 282 | 68,000 ohm resistor. |
| 284 | 350-0-350 volt winding of transformer. |
| 286 | 5 volt winding of transformer. |
| 288 | 200 ohm potentiometer. |
| 290 | 6.3 volt winding of transformer. |
| 292 | 115 volt primary winding of transformer. |

All resistors ½ watt unless otherwise stated.

The remaining elements shown in Fig. 3 that are not specifically described hereabove have been numbered commencing with No. 202 and terminating with No. 292 for the purpose of applying to all the elements the proper electrical value so that the present circuit may be understood.

*Safety features*

The thermal time delay relay RF is arranged to have a delay of about twenty seconds before contact 60 is closed by movement of the contact CRF. The purpose of this delay is to enable the sonic amplifier circuit of Fig. 3 to heat up to proper operating temperature before the motor circuit can be established by the actuation of the thermostat T. This is an important feature as it prevents a lock-out which would otherwise occur should there be a power failure to stop the motor followed by the power coming on again within a short period. Power failure causes contact CRF to open preventing reestablishment of the motor circuit until the sonic amplifier circuit has been warmed up properly upon the reestablishment of power. The thermal relay RF also prevents application of power to the motor for that instant when the sonic amplifier relay S closes momentarily during the warm-up period of the sonic amplifier circuit.

The thermal time delay CTS is used as back up protection in case contact CTD should fail to open normally during the start cycle after a delay of 10 to 50 seconds. Timer CTS does not open on normal operation because CTD functions first, normally opening within 6 to 12 seconds, breaking the circuit in which timer CTS is positioned. On the other hand, should CTD fail to function for any cause, then CTS will come into operation as an additional means to break the circuit through wire 66, 70 and 74 to deenergize relay RO and thus open contact CRO, and $CRO_2$ to break the spark circuit through $CRO_2$. Relay RO will be locked out until the circuit is restored by manually resetting CTS.

By using contact $CRO_2$ (controlled by RO) instead of a thermal timer to cut off the spark, the system is ready to start immediately after a short loss of power whereas with a thermal time delay for cutting off the spark, the contacts might not reclose until after contact CTD had opened and the circuit was locked out.

From the foregoing, it will be understood that the sonic amplifier circuit and the sonic control relay circuit are representative of types of circuits that could be devised to carry out the basic objectives of the invention. Accordingly, applicant intends that the claims that follow hereinafter shall be of such scope as to include any circuits that will function in the manner of the specific circuits disclosed to produce the desired result. In other words, the sonic amplifier circuit is designed to be a circuit capable of actuating a relay whenever flame sounds are present in the firebox, these sounds being in the order of 20 to 200 cycles and of an amplitude to bring the total sound presented to the sound pickup above the minimum required for actuation of the circuit. The details of the sonic control relay circuit, in view of the above explanation, may likewise be varied in detail so long as it functions to shut off the pump motor whenever there is ignition failure or combustion failure or the temperature requirements are satisfied.

While the description given of the operation heretofore has been concerned with an oil burner, it will be understood that a gas burner is considered to be within the scope of the claims as gas burner valves are commonly electrically controlled. Therefore, the same circuits heretofore described can be utilized to actuate a gas burner valve the same as they actuate the pump motor. The microphone used will be of such character as to pick up the frequencies of the flame whether it be an oil flame or gas flame. In all cases, the typical circuit will be arranged to be operated by whatever current and voltage is available which will be, in the ordinary case, 110 to 120 volts.

While the specific example described heretofore constitutes a preferred arrangement, the following comments are made to indicate how the arrangement of the elements may be varied without decreasing the effectiveness of the control. For example, the distance of the pickup from the combustion chamber may be from a few inches to several feet without detrimental effect. The diameter of the sound pickup tube 22 is not critical and may vary greatly. By utilizing a pickup which comprises a ceramic piezoelectric element, the ambient temperature of the pickup may be in excess of 200° F. without detriment. However, as the proximity of the pickup to the combustion chamber has little effect, any type of pickup can be used if a longer sound tube is utilized, thereby reducing the temperature at the pickup. The pickup is completely sound shielded from all external sounds and is only responsive to those sounds transmitted into the sound tube which, of course, are those sounds present in the combustion chamber. It should also be noted that while the present disclosure is illustrative of typical oil or gas burners, others of any special type that have not herein been referred to, may be equally well controlled by the present sonic control method even though the frequency characteristics of the flame of such other burners may vary from the frequencies that have been utilized to actuate the present control means. Furthermore, this sonic control is equally well adapted to monitor in any band of frequencies in the audible spectrum. It may be of a fixed range, as illustrated for oil burners, or it may be tunably adjusted, as a radio, to any desired frequency band. It has been found that gas combustion sound is composed of frequencies many times greater than those of oil. However, the present system by using a filter circuit responsive to the higher frequencies can just as easily filter out all other unwanted frequencies and thus is readily adaptable for any control purposes. Therefore, it should be noted that the frequencies referred to in this disclosure are illustrative only.

Other modifications

In Fig. 6 is shown schematically another arrangement of the sonic control. In this case, the main flame 300 is ignited by a pilot flame 302. In situations of this kind, the sequence of operations is as follows. The controls in the place to be heated call for heat. This puts the burner 304 in operation, which runs for a short time to purge gases from the boiler. A spark is then established by the pilot igniter 306, adjacent the pilot gas outlet. The pilot burner valve 308 is then opened, with the result that the spark ignites the gas, producing a pilot flame. Upon establishment of the pilot flame, the main fuel valve 310 is opened with the result that combustion of the main flame then takes place under the influence of the pilot flame. With combustion established, the spark at the pilot burner is discontinued but the pilot flame continues in operation along with the main flame. After the controls call for shutting down the burner, the main fuel valve 310 is closed but the burner motor continues to run for a short time thereafter to purge the boiler. The burner then shuts down, and this is followed by the closing of the pilot burner valve so that the pilot flame is then extinguished.

In order that this sequence of operations may be monitored against failure, the sound detector 312 is introduced at a position where it may receive the sounds of both the pilot flame and the main flame. The sounds so received are transmitted to the amplifier 314 which is of the same character as that shown in Fig. 3, and the amplified current so produced is then passed through filters 316 and 318 and thence on to the control relays 320, which relays, as is shown in the drawing, are effective to actuate the main fuel supply valve 310 and the pilot fuel supply valve 308. The filter 316 is responsive to the main flame combustion sounds only, while the filter 318 is responsive to the pilot sounds only. Thus, failure of the pilot flame to be generated after the valve 308 has been opened will operate in the manner heretofore described to shut down the burner and close the valve 308. If the pilot flame is produced in the normal manner but the main flame fails to ignite, or fails after ignition, then the sound detector will so note and will operate through the amplifier and filters to cause the control relays to shut down the system, including closing valves 308 and 310 and stopping burner 304.

The arrangement in Fig. 6 contemplates filtering of the sounds picked up by the sound detector by filters related to the amplifier. In Fig. 7 the arrangement differs in this respect. The sound detector 322 is of a type which may filter the sounds mechanically and directly by means of elements 324 and 326. Element 324 is a sound detector designed to be responsive to the pilot flame sounds only, while the element 326 is a sound detector designed to be responsive to the main flame combustion sounds only. These filtered sounds are then transmitted in the form of electrical impulses to the amplifier 328 which in turn is effective to influence the control relays 330 in the same manner that the amplifier of Fig. 3 influences the control relays shown in Fig. 4.

*Further modifications*

In Fig. 8 is shown a circuit constituting a modification of the sonic amplifier shown in Fig. 3. This circuit accomplishes the same result as that of Fig. 3, but requires the use of only two dual triode tubes, thus materially reducing the expense of manufacturing the circuit. This circuit can be so cheaply manufactured that in the event of failure, the unit may be discarded and another substituted with negligible expense to the user.

Fig. 9 shows the wiring diagram of another form of sonic control relay. This circuit is adapted for the use with the amplifying circuits shown in Fig. 8 and differs only slightly from the wiring of Fig. 4.

The operation of the sonic control shown in circuits disclosed in Figs. 8 and 9 is as follows: Let us assume prior to the commencement of the heating cycle, the burner is off and the thermostat 400 is not calling for heat.

The temperature of the space falls and thermostat 400 closes the contacts W and B. This energizes relay RT through the circuit 402, normally closed contact $CS_2$, normally closed contact $CRS_1$, wires 438 and 434, thermo switch heater $TD_1$ relay RT and normally closed switch $CTD_1$ through the secondary of the transformer 404 and thence back to contact W of the thermostat.

The actuation of relay RT closes contact $CRT_1$ and $CRT_2$, $CRT_3$ and opens $CRT_4$. The closing of $CRT_1$ energizes the pump motor 406, through wires 408, 410, 412 and 424. The spark transformer 420 is also energized by the closing of $CRT_1$ through wire 410, normally closed contact $CRS_2$, wire 422 to the spark transformer and thence through wire 424 to the line. The closing of $CRT_2$ shunts the circuit through wire 436 and contact $CS_2$ via wires 414 and 416. The closing of $CRT_3$ establishes an auxiliary holding circuit from the thermostat through wire 418.

As soon as combustion starts contact $CS_2$ opens upon the energizing of coil S which occurs as soon as the flame sound is picked up by the sonic amplifier circuit shown in Fig. 8 and which will be explained in more detail hereinafter. Contacts $CS_1$ and $CS_3$, normally open, are closed by the actuation of coil S.

The closing of $CS_3$ energizes relay RS via 402, 414, $CRT_2$, 416, 426, $CS_3$, 427, RS, 429, and switch $CTD_1$, to open contacts $CRS_1$ and $CRS_2$. A holding circuit for relay RT is established through the thermostat 400, 402, 414, $CRT_2$, 416, 426, $CS_1$, thermal switch heater 428, 430, 432 through coil RT to switch $CTD_1$, through transformer 404 back to the thermostat 400.

The opening of contact $CRS_1$ breaks the circuit through wire 434 thus preventing thermal heated $TD_1$ from heating to a degree at which switch $CTD_1$ would open. The opening of contact $CRS_2$ breaks the circuit through transformer 420 to cut off the spark 421. With the circuits now established, the motor 406 continues to run and heating progresses in the usual manner.

In due course, the temperature in the space will rise to affect the thermostat 400. The B contact of the thermostat opens first. This throws the heat anticipating resistor HA in series with the control circuit thereby heating the resistor HA and hastening the opening of the W contact of the thermostat. When W opens relays RT and RS are both deenergized and combustion immediately stops because contact $CRT_1$ upon opening breaks the motor circuit.

The foregoing is the normal sequence of operation and this cycle will be repeated for each heating cycle. The safety features of the circuits will now be explained.

If combustion should fail to occur after the starting of motor 406 and the spark 421, then the sonic amplifier shown in Fig. 8 receiving no flame sound would fail to energize coil S. Thus, contact $CS_3$ would not be closed, the relay RS would remain unenergized and contact $CRS_1$ would remain closed. With the circuit thus set, current would flow actively through the thermo switch heater $TD_1$ via 402, 436, $CS_2$, $CRS_1$, 438, 434, $TD_1$, RT, $CTD_1$, 404 to W. This causes $CTD_1$ to open in about 20 seconds. $CTD_1$ on opening is locked in that position and must be manually reset. The opening of $CTD_1$ breaks the circuit through relay RT, opening contact $CRT_1$ to break the motor circuit and the spark coil circuit.

If combustion starts normally after the call for heat by thermostat 400, the motor 406 will be running and the spark coil 420 will have been deenergized. If subsequently, combustion is lost, then the sonic amplifier of Fig. 8 will repond to such failure and coil S will immediately be deenergized. This will open contacts $CS_1$ and $CS_3$ to cause immediate deenergizing of relays RT and RS. This in turn will close contacts $CRS_1$ and $CRS_2$ so that upon the closing of contactor $CS_2$, relay RT will be reenergized and the spark will be turned on again with the motor 406 continuing to run. In other words, if the burner flame goes out after it had been in normal operation, but before the thermostat 400 is satisfied, then the spark 421 will immediately go into action so that it will be ready to reignite the oil should any thereafter come into the firebox.

$CRT_1$ controlling both the motor and spark may open momentarily because of the momentary deenergizing of relay RT, but it will reclose instantly as RT is reenergized through $CS_2$ and $CRS_1$. With the spark 421 now in operation, if combustion does not recommence, $CS_1$ will not be closed because coil S will not be energized by operation of the sonic amplifier of Fig. 8. There will then be a circuit from the thermostat through 402, 436, $CS_2$, $CRS_1$, 438, 434 through thermo switch heater $TD_1$, relay RT and switch $CTD_1$. This will cause the opening of $CTD_1$ in about 20 seconds to be locked out. Opening of $CTD_1$ deenergizes RT, thereby opening the motor and spark circuits, shutting the system down. The motor cannot thereafter be restarted without manual resetting of $CTD_1$.

If during normal operation of the burner, there should be a loss of line power, all relays will be deenergized and combustion will cease. On a resumption of power with the thermostat 400 still closed, RT will be energized to close $CRT_1$, thereby starting motor 406 and the spark 421. The sonic amplifier circuit of Fig. 8 which will have been deenergized with the power failure will require 10 to 12 seconds to heat up to become operative so if combustion has already started by the time the amplifier circuit is heated up, the coil S will be actuated to close contacts $CS_1$ and $CS_3$.

$CS_3$ will energize coil RS via wire 427. This will open contact $CRS_1$ which will prevent further heating of thermal time delay $TD_1$ which would otherwise open contacts $CTD_1$ in 20 seconds. Thus, before a lockout of $CTD_1$, the sonic amplifier is back in operation to energize coil S.

There is always the remote possibility of the failure of some component in the sonic amplifier shown in Fig. 8, which failure might cause the coil S of the relay to be energized when no flame sound is present. In such case, the following action will take place: If the failure of the component occurs while the thermostat 400 is open, and coil S is thereby energized, contacts $CS_2$ will open and CS₁ will close. This will prevent relay RT and the thermo switch heater coil TD₁ from being energized when the thermostat is thereafter closed. With CS₂ open RT cannot be energized. Hence, pump motor and spark will remain deenergized because CRT₁ is open. Since coil TD₁ cannot be energized, it will not cause the opening of switch CTD₁ which will therefore not be locked out. By observing that the burner will not start and that the thermal lockout CTD₁ cannot be reset, the user will know that the control needs service on the sonic amplifier shown in Fig. 8.

If a failure of a component of the sonic amplifier occurs during combustion without subsequent combustion failure so that coil S continues energized, then contactor CS₁ will hold relay RT energized until either the thermostat 400 or the limit switch LS opens and shuts off power to relay RT and the burner. With contact CS₁ remaining closed, the unit will not restart because CS₂ is open.

In some existing electronic combustion controls, there are no means for cutting off the oil supply if there should be a non-safe component failure during combustion followed by combustion failure. In order to overcome this inherent weakness of these systems, another safety feature is provided in the following manner.

At the start of combustion, the thermo heater coil TD₃ is heated and switch CTD₃ will close in about 90 seconds thereafter. A bimetallic element BM having a switch related thereto is located in the stack at the mouth of the microphone pickup tube or any other suitable location. BM is set to open before CTD₃ closes so coil TD₁ is normally never energized through the path CTD₃ and BM. When combustion is lost and CS₁ fails to open because coil S continues energized due to the sonic amplifier failure, thermo heater TD₃ remains energized causing CTD₃ to remain closed. As the stack cools, BM will close and coil TD₁ will be energized through the path of the thermostat 400, CRT₂, CTD₃, BM, TD₁, relay RT and CTD₁. This will cause lockout of the control circuit as soon as CTD₁ opens to shut down the burner.

If a failure indicating light is desired, it may be connected as shown through a normally closed contact CRT₄ of relay RT. Whenever the thermostat is closed and RT is not energized, the light FL will be on, indicating that there has been a starting failure, a combustion failure, or a component failure in the sonic amplifier circuit as heretofore described.

From the foregoing description of Fig. 9, it can be seen that it serves the same purpose of the circuit shown in Fig. 4. The relays function to start and stop the motor and the spark as heat is called for by the thermostat and upon failure of combustion, or failure of combustion to start, the relays will operate to open the various safe circuits to safe position. In addition, if there should be failure of a component of the sonic amplifier circuit, then the result will also be opening of the circuits so that the motor cannot operate to pump oil into the fire box in the absence of the ignition spark. Thus, no dangerous situation can be established.

The sonic amplifier circuit shown in Fig. 8 is self-explanatory from an examination of the diagram. The circuit includes two dual triode tubes in which T1A and T1B are in one envelope and T2A and T2B are in a second envelope. The microphone 440 positioned where it may receive the flame sound is connected by wires 38 and 40 to the amplifier circuit at points 442 and 444. The line is connected to the amplifier at A and B across which is transformer 445 for providing voltage of 11.5 volts across the heater elements in the tubes. The heater connections are at the points 4, 5 and 9 of the tubes as shown. The resistors in the circuits are numbered 448, 450, 452, 454, 456, 458, 460, 462, 464, 468, 470 and 472.

The condensers are numbered 474, 476, 478, 480, 482, 484, 485, 486, 488 and 490. The coil S of Fig. 8 is the coil of the relay S shown in Fig. 9.

A selenium rectifier SR is indicated at 492.

The values of the various elements used in the circuit of Fig. 8 are as follows: The tubes T1A and T1B are 12AT7. The tubes T2A and T2B are 12AU7. All resistors are ½ watt. The relay S is a 10,000 ohm D. C. relay. The selenium rectifier SR is 75 milliamperes, 130 volts.

The values of the resistors in megohms and kilohms are as follows:

| | |
|---|---|
| 448 | 470 K. |
| 450 | 47 K. |
| 452 | 470 K. |
| 454 | 4.7 M. |
| 456 | 6.8 K. |
| 458 | 1.8 M. |
| 460 | 6.8 K. |
| 462 | 1 M. |
| 464 | 220 K. |
| 468 | 1 M. |
| 470 | 47 ohms |
| 472 | 1.5 K. |

The values of the condensers in microfarads and volts are as follows:

| | |
|---|---|
| 474 | 50 mf., 25 v. |
| 476 | .02 mf., 200 v. |
| 478 | .02 mf., 200 v. |
| 480 | 50 mf., 25 v. |
| 482 | .02 mf., 200 v. |
| 484 | 20 mf., 150 v. |
| 485 | .05 mf., 200 v. |
| 486 | 20 mf., 150 v. |
| 488 | 20 mf., 150 v. |
| 490 | 20 mf., 150 v. |

From the foregoing explanation of Figs. 8 and 9 in which Fig. 8 is a simplified amplifier circuit effective to amplify the small fluctuating current produced by the microphone and created by the presence of flame, it can be seen that the circuits shown in Fig. 9 for controlling the motor and spark will be effective to cause the circuits to fail safe whenever there is failure of combustion to commence when called for by the thermostat or whenever combustion fails during operation prior to the thermostat being satisfied.

In the claims where the word "microphone" is used, it is to be regarded as the equivalent of the broader term "sound sensitive means" or "sound detection means." While a conventional microphone has been shown in the drawings and is accordingly the term generally used in the claims, it will be understood that other types of mechanisms for the sensing of sounds might be used. Therefore, applicants wish to be distinctly understood that they intend to include within their invention, the use of all types of sound sensitive means or sound detection means.

Wherever the word "thermostat" is used in the claims, it will be understood that it has been used because in the typical system this sonic control will be used in cooperation with a heating system which will in most cases utilize a conventional thermostat. However, it will be understood that the combustion may be inaugurated by the actuation of an element influenced by a changing condition other than temperature, and, therefore, the word "thermostat" is to be considered the equivalent of any type of sensing means capable of noting a changed condition which is utilized as the basis for inauguration of combustion.

It is our intention to cover all changes and modifications of the example of the invention herein chosen for purposes of the disclosure which do not constitute departures from the spirit and scope of the invention as defined by the appended claims.

We claim:

1. The method of controlling the supply of fuel to a burner the flame of which occurs in a firebox and produces sound wave energy that is substantially confined to a narrow band of audio frequencies characteristic of the type of fuel being burned, comprising the steps of detecting the sounds in said firebox to the exclusion of sounds occurring outside of said firebox, creating a fluctuating composite signal output whose fluctuations correspond in frequency and amplitude to the composite sounds detected in said firebox, applying said signal output to a filter to detect and pass only the signal components thereof whose frequencies fall within the said narrow band of audio frequencies characteristic of the flame sounds of the particular fuel being burned, maintaining the supply of fuel to the burner so long as the amplitude of the signal components passed by the filter exceeds a predetermined value which value corresponds to the maximum intensity of extraneous sounds occurring in said firebox when a flame is absent and fuel is being supplied to the burner, and terminating the flow of fuel to the burner when the amplitude of the signal components passed by the filter falls below said predetermined value.

2. The method of controlling the supply of fuel to a domestic-type oil burner the flame of which occurs in a firebox, comprising the steps of detecting the sounds in said firebox to the exclusion of sounds occurring outside of said firebox, creating a fluctuating composite electrical signal whose fluctuations correspond in frequency to the composite sounds detected in said firebox, filtering said composite signal to detect and pass only those signal components thereof having a frequency in the range of 20–200 cycles per second, maintaining the supply of fuel to the burner so long as the amplitude of the signal components passing the filter exceeds a predetermined value which value corresponds to the maximum intensity of extraneous sounds occurring in the firebox when a flame is absent and fuel is being supplied to the burner, and terminating the flow of fuel to the burner when the amplitude of the signal components passing the filter falls below said predetermined value.

3. The method of controlling the supply of gaseous fuel to a gas burner the flame of which occurs in a firebox and produces sound of a band of frequencies characteristic of the gaseous fuel being burned in said firebox, said method comprising the steps of detecting the sounds in said firebox to substantially full exclusion of sounds outside of said firebox, creating a fluctuating signal current whose fluctuations correspond to the frequency and amplitude of the sounds detected in said firebox, filtering said current to detect and pass only those signal components thereof whose frequencies fall within the band of frequencies characteristic of the flame sounds of the gaseous fuel being burned, amplifying the signals passed by said filter, shutting off the flow of gaseous fuel to the burner when the amplitude of said amplified signals drops below a predetermined threshold value which value is indicative of the presence of a flame, and maintaining the flow of fuel to the burner so long as the amplitude of said amplified signals exceeds said predetermined threshold value.

4. In a heating system comprising a heater having a firebox, a burner and a burner fuel supply means for supplying fuel to the burner to produce a flame in said firebox whereby normal burning of the fuel to produce said flame is characterized by the generation of sound wave energy substantially confined to a narrow band of audio frequencies characteristic of the type of fuel being burned, the combination comprising a control circuit including a switch for said fuel supply means, said control circuit acting to maintain steady operation of said supply means so long as said switch is closed and being operative to completely terminate operation of said supply means when said switch is opened, sound pickup means for detecting sounds within said firebox to substantially complete exclusion of sounds exterior of said firebox and for producing a fluctuating composite signal output whose fluctuations correspond in frequency and amplitude to the composite sounds in said firebox, means for filtering said output to pass only those signal components thereof that have a frequency falling within said band of audio frequencies, and means responsive to the amplitude of the signal components passed by said filter for holding said switch closed so long as said signal components have an amplitude in excess of a predetermined value which value corresponds to the maximum intensity of sounds normally occurring in said firebox when said fuel supply means is operating and no flame is present, and for opening said switch when the amplitude of said signal components falls below said predetermined value.

5. In a heating system comprising a heater having a firebox, a burner, a burner fuel supply means for supplying fuel to the burner, and means for igniting said fuel to produce a flame in said firebox whereby burning of the fuel to produce said flame is characterized by the generation of sound wave energy substantially confined to a narrow band of audible frequencies characteristic of the type of fuel being burned, the combination comprising a control circuit including a relay switch and a thermostat switch for said fuel supply means, said control circuit acting to maintain steady operation of said supply means so long as said relay switch and thermostat switch are both closed and being operative to completely terminate operation of said fuel supply means when one of said relay switch and thermostat switch is opened, a sound pickup positioned to be responsive to sounds in said firebox and shielded against sounds extraneous to said firebox, said sound pickup acting to produce a fluctuating signal current whose fluctuations correspond in frequency and amplitude to the sounds in said firebox, means for filtering said current to pass only those signals having a frequency falling within said narrow frequency band characteristic of the fuel being burned, means for amplifying said signals, and switch control means responsive to the output of said amplifier for controlling operation of said relay switch in accordance with the amplitude of the output of said amplifier, said switch control means acting to keep said relay switch closed so long as the amplitude of said amplifier output is above a predetermined value which value corresponds to the maximum intensity of sounds normally occurring in said firebox when said fuel supply means is operating and no flame is present, said switch control means acting to open said relay switch when the amplitude of said amplifier output falls below said predetermined value.

6. In a fuel-bringing system characterized by the production of a flame in a chamber and also characterized by the presence of sound wave energy generated by the process of burning the fuel to produce said flame, said sound wave energy produced by the burning of the fuel having an audible frequency band determined by the type of fuel being burned, the combination of a sound wave pickup device displaced from the flame but responsive to sound wave energy in said chamber propagated from said flame, to the substantially complete exclusion of sounds exterior of said chamber, said pickup device being constructed to produce a varying composite signal output corresponding in frequency to the composite frequencies of the sound energy received by said pickup device, filter means coupled to said pickup device for filtering said composite output signal to pass only those signal components having a frequency falling within said frequency band, an amplifier for amplifying the signal components passed by said filter means, and means responsive to the amplified output of said amplifier for controlling the supply of fuel to the system in accordance with the amplitude of said amplified output, said control means being operative to maintain a steady supply of fuel to the system so long as the amplitude of the said amplified output is above a predetermined value corresponding to the maximum level of all sounds reaching said pickup device when a flame is absent, and being operative to completely terminate the supply of fuel to the system when the amplitude of said amplified output falls below said predetermined value.

7. The combination of claim 6 wherein said pickup device comprises a microphone having maximum response within said band of frequencies.

8. The combination of claim 6 wherein said filter means is designed to pass only those frequencies falling with a frequency band of 20 to 200 cycles per second.

9. In a fuel-burning system characterized by the production of a flame in a chamber of dimensions sufficient that the flame is unconfined in the medium within the chamber and also characterized by the presence of sound wave energy generated by the process of burning of the fuel having an audio frequency band determined by the type of fuel being burned, the combination of a sound wave pickup device displaced from the unconfined flame but responsive to sound wave energy propagated from said flame through said medium to the substantially complete exclusion of sounds exterior of said chamber, said pickup device being constructed to generate varying voltage signals corresponding in frequency to the frequencies of the sound energy received by said pickup device, means coupled to said pickup device for filtering out signals produced by said pickup device in response to sound wave energy having a frequency outside of the frequency band of the sound wave energy produced by the burning fuel and for passing all signals produced by said pickup device in response to sound wave energy having a frequency falling within said same frequency band, an amplifier for amplifying signals passed by said filter means, and means responsive to the amplified output of said amplifier for controlling the supply of fuel to the system in accordance with the amplitude of said amplified output, said control means being operative to maintain the supply of fuel to the system so long as the amplitude of said amplified output is above a predetermined value which value corresponds to the maximum intensity of extraneous sounds in the system when a flame is absent, and being operative to terminate the supply of fuel to the system when the amplitude of said amplified output falls below said predetermined value.

10. In a heating system comprising a heater having a firebox, a burner, means for supplying fuel to the burner to produce a flame in said firebox whereby normal burning of the fuel in said firebox is characterized by the generation of sound wave energy substantially confined to a narrow band of audible frequencies determined by the type of fuel being burned, the combination comprising a control circuit including a relay-controlled switch means and a thermostat switch means for said fuel supply means, said control circuit acting to maintain steady operation of said supply means so long as said relay-controlled switch means and said thermostat switch means are both closed and being operative to completely terminate operation of said supply means when one of said relay-controlled switch means and thermostat switch means is opened, a sound pickup positioned to be responsive to sounds within said firebox and shielded against sounds extraneous to said firebox, said sound pickup being operative to provide a fluctuating composite signal current whose fluctuations correspond in frequency and amplitude to the composite sounds within said firebox, means for filtering said current to pass only those signals having a frequency falling within said narrow band of frequencies characteristic of the fuel being burned, and means responsive to the signals passed by said filter (1) for holding said relay controlled switch means closed so long as the amplitude of the signals passed by said filter is above a predetermined value which value corresponds to the maximum intensity of sounds normally occurring in said firebox when said fuel supply means is operating and no flame is present, and (2) for opening said relay-controlled switch means while said thermostat is still closed when the amplitude of the signals passed by said filter falls below said predetermined value.

11. The combination of claim 10 wherein said sound pickup comprises a microphone having maximum response within said narrow band of frequencies.

12. In combination a heat producing means having a combustion chamber, an oil burner for producing a flame in said chamber, fuel and power supply means for said burner, a control mechanism for starting and stopping said burner, a gas burner for producing a pilot flame to ignite said oil burner, fuel supply means for said gas burner, an electronic amplifier, sound detection means positioned to be responsive to sounds emanating from said combustion chamber to the substantially complete exclusion of sounds exterior of said chamber to actuate said amplifier, first and second filter circuits connected to the output circuit of said amplifier, said first filter circuit being designed to pass only those signals having a frequency falling within the audio frequency band characteristic of the flame sounds of said gas burner, said second filter circuit being designed to pass only those signals having a frequency falling within the audio frequency band characteristic of the flame sounds of said oil burner, means responsive to signals passed by said first filter for actuating said control mechanism to initiate operation of said oil burner, and means responsive to signals passed by said second filter for causing said control mechanism to maintain operation of said oil burner.

13. In a fuel-burning system in which a flame is produced by the burning of particles of fuel in a chamber and the sound wave energy propagated by the flame is substantially confined to an audible frequency band characteristic of the fuel being burned, the combination of sound-wave detecting apparatus displaced from the flame but responsive to sound-wave energy propagated from the flame to said apparatus to the substantially complete exclusion of sounds exterior of the chamber, said detecting apparatus comprising a sound pickup device and a band-pass audio amplifier actuated by said pickup device for amplifying and passing substantially only those sound signals having a frequency falling within the said audio frequency band characteristic of the flame sounds of the fuel being burned, and means connected to said amplifier and responsive to the output thereof for maintaining a steady supply of fuel to the system so long as the amplitude of the output of said amplifier is above a predetermined threshold value which value corresponds to the maximum intensity of sounds in said chamber when a flame is absent, and for terminating the supply of fuel to the system when the output of said amplifier falls below said threshold value.

14. In a domestic heating system comprising a heater having a firebox, an oil burner for producing a flame in said firebox, means for supplying oil to the burner, and means for igniting the fuel supplied to the burner to produce in said firebox a flame which flame is attended by sound wave energy generated by the process of combustion and substantially confined to a frequency band of 20 to 200 cycles per second, the combination comprising a control circuit for said oil supply means comprising an electrically controlled switch, said circuit acting to maintain operation of said fuel supply means when said switch is closed and being operative to terminate operation of said fuel supply means when said switch is opened, a microphone positioned to be responsive to sounds in said firebox and shielded against sounds extraneous of said firebox for producing a fluctuating composite signal corresponding in frequency and amplitude to the composite sounds within said firebox, a band pass filter for passing only those signal components of said composite signal that have a frequency occurring within a frequency band of 20–200 cycles per second, means for amplifying the signals passed by said filter, and means responsive to the output of said amplifier for maintaining said switch closed so long as the amplitude of the output of said amplifier is above a predetermined value which value corresponds to the maximum intensity of sounds in said fuelbox when a flame is absent and said fuel supply means is operating, and for opening said switch when the amplitude of said amplifier output falls below said predetermined value.

References Cited in the file of this patent

UNITED STATES PATENTS

| | | |
|---|---|---|
| 2,304,641 | Jones | Dec. 8, 1942 |
| 2,352,143 | Wills | June 20, 1944 |
| 2,539,535 | Espenschied | Jan. 30, 1951 |
| 2,549,464 | Hartley | Apr. 17, 1951 |
| 2,600,928 | Semm | June 17, 1952 |
| 2,612,749 | Tenney et al. | Oct. 7, 1952 |
| 2,678,090 | Hanson | May 11, 1954 |
| 2,692,962 | Thomson | Oct. 26, 1954 |

FOREIGN PATENTS

| | | |
|---|---|---|
| 424,955 | Great Britain | Dec. 1, 1933 |

OTHER REFERENCES

Daniell: Textbook of the Principles of Physics, 3rd ed., Macmillan Co., 1911, pp. 454, 455 (Copy in Div. 19).